(12) United States Patent
Ichikawa

(10) Patent No.: US 11,273,722 B2
(45) Date of Patent: Mar. 15, 2022

(54) POWER CONVERSION APPARATUS

(71) Applicant: Toyota Jidosha Kabushiki Kaisha, Toyota Aichi-ken (JP)

(72) Inventor: Shinji Ichikawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 98 days.

(21) Appl. No.: 16/663,795

(22) Filed: Oct. 25, 2019

(65) Prior Publication Data

US 2020/0130520 A1 Apr. 30, 2020

(30) Foreign Application Priority Data

Oct. 29, 2018 (JP) .............................. JP2018-202859

(51) Int. Cl.

| | |
|---|---|
| B60L 53/16 | (2019.01) |
| B60L 3/00 | (2019.01) |
| B60L 53/10 | (2019.01) |
| B60L 53/18 | (2019.01) |
| B60L 53/30 | (2019.01) |
| H01R 13/70 | (2006.01) |
| B60L 3/04 | (2006.01) |
| B60L 53/22 | (2019.01) |

(52) U.S. Cl.
CPC .............. *B60L 53/16* (2019.02); *B60L 3/0069* (2013.01); *B60L 3/04* (2013.01); *B60L 53/11* (2019.02); *B60L 53/18* (2019.02); *B60L 53/22* (2019.02); *B60L 53/30* (2019.02); *H01R 13/70* (2013.01); *B60L 2210/30* (2013.01)

(58) Field of Classification Search
CPC .......... B60L 53/16; B60L 3/0069; B60L 3/04; B60L 53/11; B60L 53/18; B60L 53/22; B60L 53/30; B60L 2210/30; B60L 53/20; H01R 13/70; Y02T 10/70; Y02T 10/7072; Y02T 90/12; Y02T 90/14; H02J 7/02; H02J 7/0031
USPC ......................................................... 320/109
See application file for complete search history.

(56) References Cited

U.S. PATENT DOCUMENTS

| | | | |
|---|---|---|---|
| 2011/0196545 A1* | 8/2011 | Miwa ...................... | B60L 53/18 |
| | | | 700/292 |
| 2012/0293123 A1 | 11/2012 | Akai et al. | |
| 2013/0020993 A1* | 1/2013 | Taddeo ................... | B60L 53/16 |
| | | | 320/109 |
| 2015/0054466 A1* | 2/2015 | Kinomura ............... | H02J 7/007 |
| | | | 320/134 |
| 2015/0372519 A1 | 12/2015 | Abe et al. | |
| 2016/0268820 A1* | 9/2016 | Ono ....................... | B60L 53/22 |

(Continued)

FOREIGN PATENT DOCUMENTS

| | | |
|---|---|---|
| JP | 2010-239827 A | 10/2010 |
| JP | 2014-075853 A | 4/2014 |
| JP | 2016-005399 A | 1/2016 |

(Continued)

*Primary Examiner* — Paul Dinh
(74) *Attorney, Agent, or Firm* — Dinsmore & Shohl LLP

(57) ABSTRACT

A power conversion apparatus includes: a DC connector connectable to a DC power inlet of a vehicle; an AC inlet connectable to a connector of an AC power cable; and a rectifier circuit located between the AC inlet and the DC connector. The rectifier circuit is configured to convert AC power input from the AC inlet side to DC power and output the DC power to the DC connector side.

13 Claims, 8 Drawing Sheets

(56) References Cited

U.S. PATENT DOCUMENTS

2017/0368949 A1\* 12/2017 Layden .................. B60L 53/20

FOREIGN PATENT DOCUMENTS

| JP | 2016-096648 A | 5/2016 |
| WO | 2011074244 A1 | 6/2011 |

\* cited by examiner

POWER CONVERSION APPARATUS

CROSS REFERENCE TO RELATED APPLICATIONS

This nonprovisional application claims priority to Japanese Patent Application No. 2018-202859 filed on. Oct. 29, 2018 with the Japan Patent Office, the entire contents of which are hereby incorporated by reference.

BACKGROUND

Field

The present disclosure relates to a power conversion apparatus.

Description of the Background Art

In recent years, from the perspective of environmental conservation, electrically powered vehicles (e.g., electric vehicles or plug-in hybrid vehicles) powered mainly by electric power tend to increase. Such vehicles include an inlet configured to receive electric power supplied from a power feeding facility, and charge a vehicle-mounted battery with the electric power received by the inlet. When a connector of a charging cable of the power feeding facility is connected to the inlet of the vehicle, electric power can be supplied from the power feeding facility through the charging cable to the inlet of the vehicle.

An AC power supply method (hereinafter, also referred to as "AC method") and a DC power supply method (hereinafter, also referred to as "DC method") are known as main power feeding methods. A normal charger and a quick charger are known as main power feeding facilities. The AC method is used in the normal charger, and the DC method is used in the quick charger. For example, Japanese Patent Laying-Open No. 2010-239827 discloses a vehicle including a quick charger and a DC power inlet (hereinafter, also referred to as "DC inlet"). When a DC power cable (hereinafter, also referred to as "DC cable") connected to the quick charger is connected to the DC inlet of the vehicle, quick charging of a vehicle-mounted battery can be performed by the quick charger.

SUMMARY

Generally, the normal charger is considered to be a power feeding facility for a vehicle including an AC power inlet (hereinafter, also referred to as "AC inlet"). Therefore, in the case of a vehicle not including an AC inlet, charging of a vehicle-mounted battery by a normal charger is difficult. However, the widespread use of a vehicle including only a DC inlet (hereinafter, also referred to as "DC dedicated vehicle") is expected in the future. In such a case, if a normal charger cannot be used in a DC dedicated vehicle, the convenience of a user of the DC dedicated vehicle is not only lost, but the effective use of the existing normal charger (charging infrastructure) may become impossible.

The present disclosure has been made to solve the above-described problem, and an object of the present disclosure is to provide a power conversion apparatus configured to allow a vehicle including only a DC inlet to be supplied with electric power from a power feeding facility for the AC method.

A power conversion apparatus according to the present disclosure includes: a DC connector connectable to a DC power inlet of a vehicle; an AC inlet connectable to a connector of an AC power cable; and a first power conversion circuit located between the AC inlet and the DC connector. The first power conversion circuit is configured to convert AC power input from the AC inlet side to DC power and output the DC power to the DC connector side.

By using the power conversion apparatus, the AC power supplied from a power feeding facility for the AC method can be converted to the DC power and the DC power can be supplied to the vehicle. Therefore, according to the power conversion apparatus, a vehicle including only a DC inlet can be supplied with electric power from a power feeding facility for the AC method.

The power conversion apparatus may further include: an insulating circuit located between the AC inlet and the DC connector; and an interrupter configured to interrupt a current between the AC inlet and the DC connector, when the interrupter detects an abnormality of the current between the AC inlet and the DC connector.

According to the above-described configuration, when the abnormality of the current (e.g., electric leakage or overcurrent) occurs, the current can be interrupted by the interrupter to thereby protect a circuit on the power reception side.

In the power conversion apparatus, the first power conversion circuit may be located on the DC connector side relative to the insulating circuit. The interrupter may include: a first switch configured to switch conduction and cut-off of a current between the insulating circuit and the DC connector; a first current sensor configured to detect a current flowing between the first power conversion circuit and the DC connector; and a first controller configured to control the first switch. The first controller may be configured to bring the first switch into an open state to thereby cut off the current, when the abnormality of the current is detected by the first current sensor while electric power is being input to the AC inlet.

In the power conversion apparatus, a circuit on the AC inlet side and a circuit on the DC connector side are electrically insulated by the insulating circuit. Therefore, even when an overcurrent occurs in the circuit on the AC inlet side relative to the insulating circuit, the overcurrent does not flow into the circuit on the DC connector side relative to the insulating circuit. In addition, the first controller of the interrupter brings the first switch into the open state to thereby cut off the current, when the abnormality of the current is detected by the first current sensor while the electric power is being input to the AC inlet. Therefore, according to the interrupter, when the abnormality of the current occurs while the electric power is being input to the AC inlet (e.g., while the electric power is being supplied from the power feeding facility for the AC method through the power conversion apparatus to the vehicle), the circuit on the power reception side (e.g., the electronic circuit of the vehicle) can be appropriately protected.

The power conversion apparatus may further include a second power conversion circuit configured to perform prescribed power conversion. The second power conversion circuit may be located between the AC inlet and the insulating circuit. The interrupter may include: a second switch configured to switch conduction and cut-off of a current between the AC inlet and the insulating circuit; a second current sensor configured to detect a current flowing between the second power conversion circuit and the AC inlet; and a second controller configured to control the second switch. The second controller may be configured to bring the second switch into an open state to thereby cut off the current, when the abnormality of the current is detected by the second current sensor while electric power is being input to the DC connector.

In the power conversion apparatus, the circuit on the AC inlet side and the circuit on the DC connector side are electrically insulated by the insulating circuit. Therefore, even when an overcurrent occurs in the circuit on the DC connector side relative to the insulating circuit, the overcurrent does not flow into the circuit on the AC inlet side relative to the insulating circuit. In addition, the second controller of the interrupter brings the second switch into the open state to thereby cut off the current, when the abnormality of the current is detected by the second current sensor while the electric power is being input to the DC connector. Therefore, according to the interrupter, when the abnormality of the current occurs while the electric power is being input to the DC connector (e.g., while the electric power is being supplied from the vehicle through the power conversion apparatus to the outside of the vehicle), the circuit on the power reception side (e.g., an electrical load external to the vehicle that receives power feeding from the vehicle) can be appropriately protected.

The insulating circuit may be an insulating transformer including a first coil and a second coil located on the AC inlet side relative to the first coil. The interrupter may include: a switch configured to switch conduction and cut-off of a current flowing through the first coil or the second coil; and a controller configured to control the switch. The switch may be connected in series to the first coil or the second coil. The controller may be configured to bring the switch into an open state to thereby cut off the current, when the abnormality of the current is detected by the interrupter.

According to the interrupter, when the abnormality of the current is detected, the current can be cut off in the vicinity of the insulating circuit. Insulation is performed by both the insulating circuit and the switch, and thus, the circuit on the power reception side is protected more reliably.

The interrupter may include the first switch connected in series to the first coil, and the first controller configured to control the first switch. The interrupter may include the second switch connected in series to the second coil, and the second controller configured to control the second switch. The interrupter may include the first switch, the second switch, the first controller configured to control the first switch, and the second controller configured to control the second switch. In the interrupter, the first controller configured to control the first switch and the second controller configured to control the second switch may be two separate control units, or may be a common control unit (i.e., a single control unit configured to control the first switch and the second switch).

In the power conversion apparatus, the AC power cable connected to the AC inlet may be a charging cable of a power feeding facility configured to supply electric power for charging a vehicle-mounted battery to the vehicle. The AC inlet may include: a power terminal connectable to a power line of the charging cable; a CPLT signal terminal connectable to a CPLT signal line of the charging cable; and a ground terminal connectable to a ground line of the charging cable. According to the power conversion apparatus, the vehicle-mounted battery can be appropriately charged.

The first power conversion circuit may be configured to convert DC power input from the DC connector side to AC power and output the AC power to the AC inlet side.

The first power conversion circuit can perform bidirectional power conversion. According to the power conversion apparatus including the above-described first power conversion circuit, the DC power can be not only supplied from the power feeding facility for the AC method through the power conversion apparatus to the vehicle, but the AC power can be supplied from the vehicle through the power conversion apparatus to the outside of the vehicle.

The power conversion apparatus may further include an electrical outlet configured to output AC power generated through the first power conversion circuit from DC power input to the DC connector.

According to the electrical outlet, the electric power of the vehicle can be supplied to an electrical load including a plug. By providing the above-described electrical outlet, the electric power of the vehicle can also be supplied to an electrical load that is not connectable to the AC inlet.

The foregoing and other objects, features, aspects and advantages of the present disclosure will become more apparent from the following detailed description of the present disclosure when taken in conjunction with the accompanying drawings.

DETAILED DESCRIPTION

Figure 1:
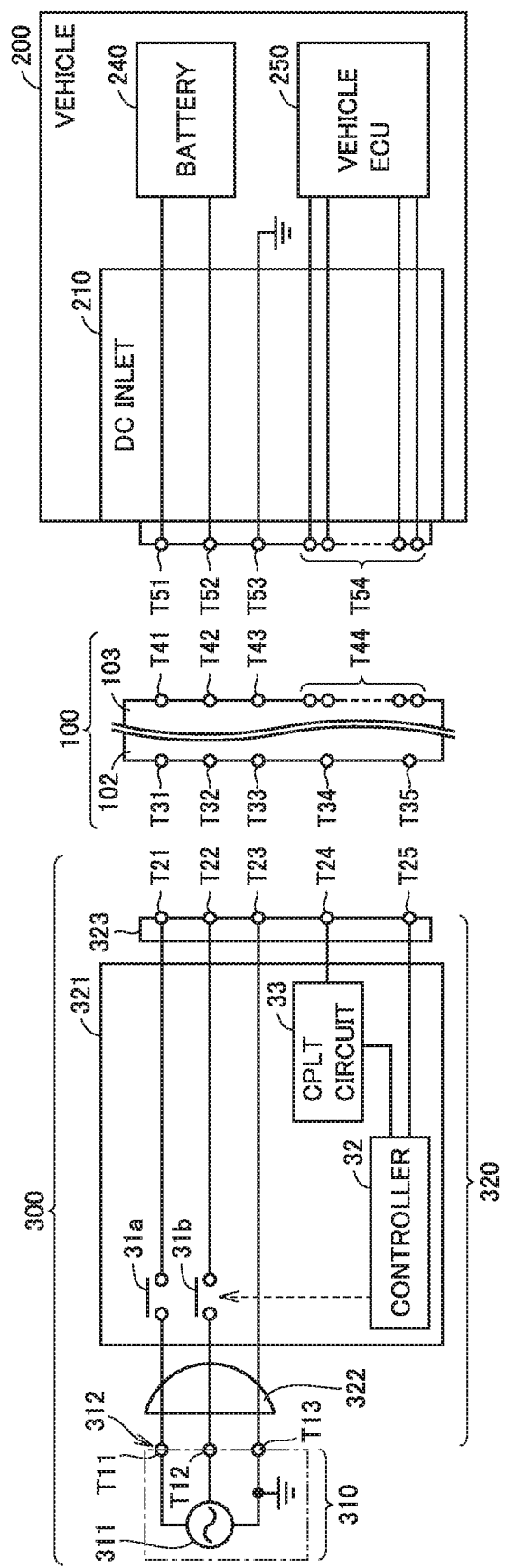
FIG. 1 is an overall configuration diagram of a power feeding system according to a first embodiment of the present disclosure.

Embodiments of the present disclosure will be described in detail with reference to the drawings, in which the same or corresponding portions are denoted by the same reference characters and description thereof will not be repeated. Hereinafter, an electronic control unit will be referred to as "ECU".

First Embodiment

FIG. 1 is an overall configuration diagram of a power feeding system according to a first embodiment of the present disclosure. Referring to FIG. 1, the power feeding system according to the present embodiment includes a power conversion apparatus 100, a vehicle 200 and a power feeding facility 300. Power conversion apparatus 100 is configured to perform power conversion between vehicle 200 and power feeding facility 300.

Vehicle 200 is a DC dedicated vehicle. That is, vehicle 200 does not include an AC inlet. Vehicle 200 includes a DC power inlet (DC inlet) 210, a battery 240 (vehicle-mounted battery) and a vehicle ECU 250. DC inlet 210 has terminals T51 to T53 and a terminal group T54. Terminals T51 and T52 are power terminals and terminal T53 is a ground terminal. Terminal group T54 includes a plurality of signal terminals. Each signal terminal included in terminal group T54 is connected to vehicle ECU 250 through a signal line.

Electric power of an external power supply (e.g., a system power supply 311) is input to terminals T51 and T52 of DC inlet 210 through power conversion apparatus 100. The electric power input to DC inlet 210 is supplied to battery 240. DC inlet 210 further includes a circuit (e.g., a not-shown filter circuit) configured to perform a prescribed process on the input electric power). As a result of the process performed by the circuit, the electric power suitable for charging of battery 240 is output from DC inlet 210 to battery 240. Vehicle 200 may be an electric vehicle that can travel using only electric power stored in battery 240, or may be a hybrid vehicle that can travel using both electric power stored in battery 240 and an output of an engine (not shown).

Power feeding facility 300 is a power feeding facility for the AC method. Power feeding facility 300 includes a power supply device 310 and a charging cable 320. Power supply device 310 includes system power supply 311 and an electrical outlet 312. System power supply 311 is an AC power supply (e.g., a single-phase AC power supply having a voltage of 100 V or 200 V) supplied with electric power from a power grid (e.g., a power grid provided by a power company). System power supply 311 is connected to electrical outlet 312 with a not-shown wiring breaker being interposed. The wiring breaker is configured to interrupt an electric power path when an abnormal current flows due to overload, a short circuit or any other factor, and forcibly stop electric power supply from system power supply 311 to electrical outlet 312 (and further, charging cable 320). Power supply device 310 may be a normal charger of an electrical outlet type. Electrical outlet 312 may be an electrical outlet (e.g., an outdoor electrical outlet box) provided on an outer wall of a house.

Figure 2:
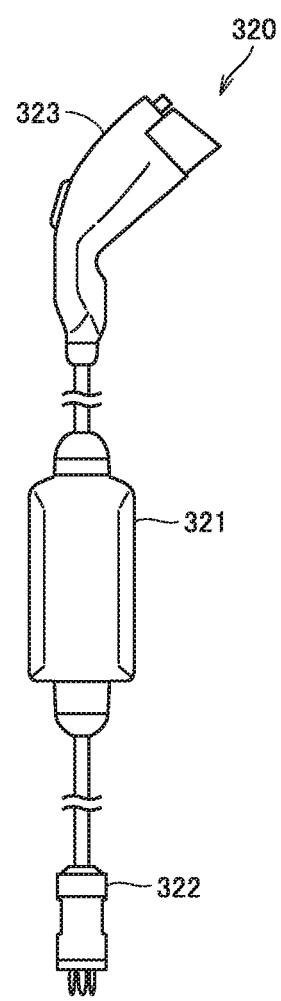
FIG. 2 shows an appearance of a charging cable used in the power feeding system shown in FIG. 1.

Charging cable 320 is an AC power cable (AC cable) and is, for example, a general charging cable used in power feeding in accordance with the AC method. FIG. 2 shows an appearance of charging cable 320. Referring to FIG. 2, charging cable 320 includes a CCID (Charging Circuit Interrupt Device) box 321, a plug 322 and an AC connector 323.

Referring again to FIG. 1, plug 322 has terminals T11 to T13. When plug 322 is connected to (e.g., inserted into) electrical outlet 312 (plug receptacle), terminals T11, T12 and T13 of plug 322 are electrically connected to a hot end, a cold end and a ground of system power supply 311, respectively.

Relays 31a and 31b, a controller 32 configured to control relays 31a and 31b, and a CPLT circuit 33 are built into CCID box 321. AC connector 323 has terminals T21 to T25. Terminals T21, T22 and 123 are connected to terminals T11, T12 and T13 through electric lines, respectively. However, a relay 31a is provided in the electric line connecting terminal T11 and terminal T21, and a relay 31b is provided in the electric line connecting terminal T12 and terminal T22. The electric line connecting terminal. T13 and terminal. T23 corresponds to a ground line and terminal T23 corresponds to a ground terminal. CPLT circuit 33 is connected to terminal T24 through a signal line. The signal line connecting CPLT circuit 33 and terminal T24 corresponds to a PISW signal line and terminal T24 corresponds to a PISW signal terminal. In addition, controller 32 is connected to terminal T25 through a signal line. The signal line connecting controller 32 and terminal T25 corresponds to a CPLT signal line and terminal T25 corresponds to a CPLT signal terminal. A CPLT signal (control pilot signal) and a PISW signal (cable connection signal) are signals in accordance with the standards of "SAE Electric Vehicle Conductive Charge Coupler".

Controller 32 is configured to communicate with another controller (e.g., a controller of power conversion apparatus 100) in accordance with the CPLT signal, in a state where AC connector 323 is connected to an AC inlet (e.g., an AC inlet of power conversion apparatus 100). For example, using the CPLT signal, controller 32 can provide information about charging, such as a connection state of charging cable 320 and a current capacity of charging cable 320. In addition, using the CPLT signal, controller 32 can receive information about charging (e.g., a notification indicating whether or not electric power supply is possible) from the other controller. Controller 32 initially sets relays 31a and 31b in an open state. When electric power supply is permitted, controller 32 brings relays 31a and 31b into a closed state.

CPLT circuit 33 is configured such that an impedance of a signal path varies between a state in which AC connector 323 is connected to the AC inlet (e.g., the AC inlet of power conversion apparatus 100) and a state in which AC connector 323 is not connected to the AC inlet. CPLT circuit 33 outputs the PISW signal (i.e., a signal indicating whether or not charging cable 320 is connected) generated using such variation in impedance to controller 32. Controller 32 can determine a connection state (connection/disconnection) of charging cable 320 based on the PISW signal input from CPLT circuit 33.

Figure 3:
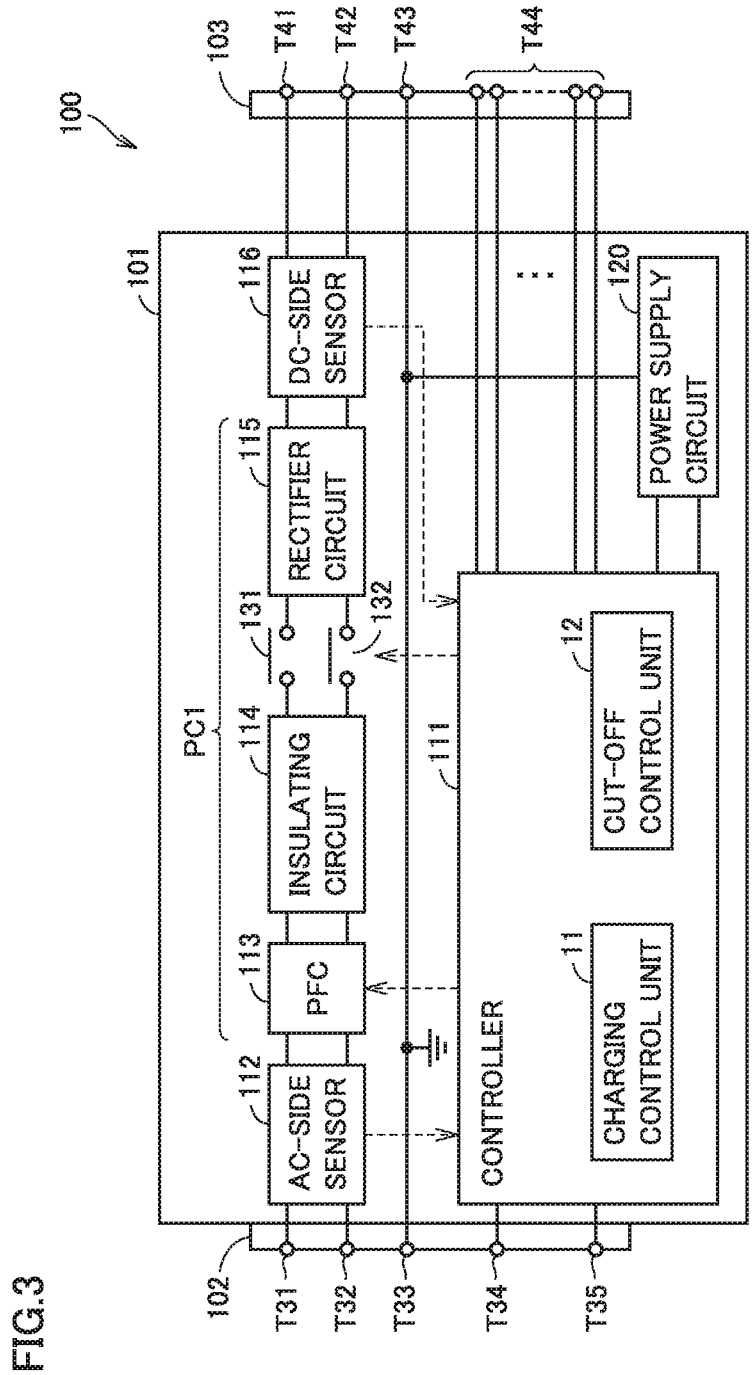
FIG. 3 shows a configuration of a power conversion apparatus according to the first embodiment of the present disclosure.

With a configuration described below, power conversion apparatus 100 allows a vehicle including only a DC inlet (DC dedicated vehicle) to be supplied with electric power from a power feeding facility for the AC method. FIG. 3 shows a configuration of power conversion apparatus 100 according to the first embodiment of the present disclosure.

Referring to FIG. 3, power conversion apparatus 100 includes a main body, portion 101, an AC inlet 102 and a DC connector 103. Main body portion 101 includes a controller 111, an AC-side sensor 112, a power conversion circuit PC1, a DC-side sensor 116, and a power supply circuit 120. Power conversion circuit PC1 includes a power factor correction (PFC) circuit 113, an insulating circuit 114, a rectifier circuit 115, and cut-off switches 131 and 132. AC inlet 102 has terminals T31 to T35 and is configured to be connectable to AC connector 323 of charging cable 320 (FIG. 1). DC connector 103 has terminals T41 to T43 and a terminal group T44 and is configured to be connectable to DC inlet 210 of vehicle 200 (FIG. 1).

Figure 4:
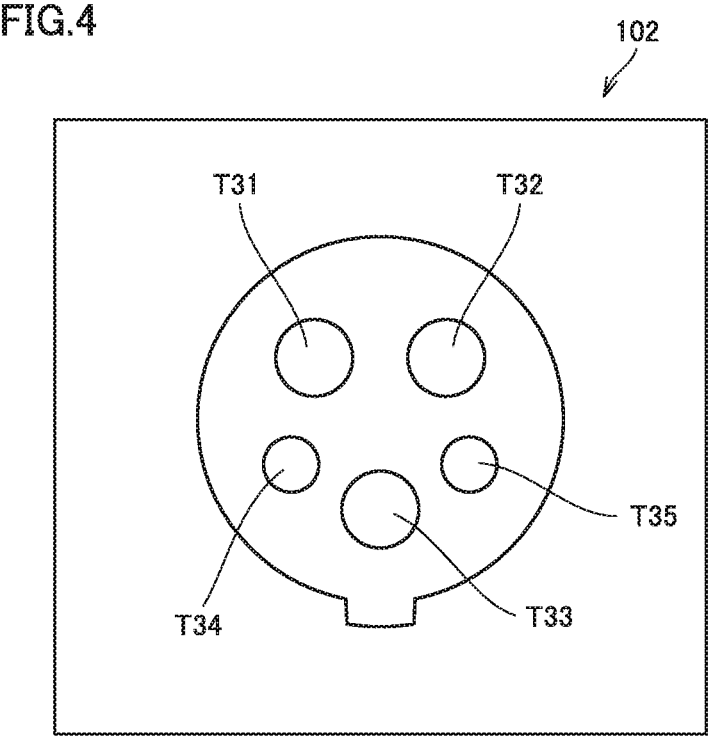
FIG. 4 shows a connection surface of an AC inlet of the power conversion apparatus shown in FIG. 3.

FIG. 4 shows a connection surface of AC inlet 102. Referring to FIG. 4 together with FIG. 3, terminals T31 and T32 of AC inlet 102 are power terminals (a HOT terminal/a COLD terminal) to which AC power is input. Terminal T33 is a ground terminal and is electrically connected to a ground line in main body portion 101. Terminal T34 is a PISW signal terminal and is connected to controller 111 through a PISW signal line in main body portion 101. Terminal T35 is a CPLT signal terminal and is connected to controller 111 through a CPLT signal line in main body portion 101.

Referring to FIGS. 1 and 3, terminals 131 to T35 of AC inlet 102 correspond to terminals T21 to T25 of AC connector 323 of charging cable 320, respectively. In a state (fitted state) where AC inlet 102 is connected to AC connector 323, terminals T31 to T35 of AC inlet 102 are connected to terminals T21 to T25 of AC connector 323, respectively. When terminals 121 and T22 are electrically connected to terminals T31 and T32, AC power can be supplied from system power supply 311 through charging cable 320 to AC inlet 102. When terminal T23 is electrically connected to terminal. T33, the ground line of charging cable 320 is electrically connected to the ground line in main body portion 101. When terminal T24 is electrically connected to terminal 134, the PISW signal output from CPLT circuit 33 of charging cable 320 is input to controller 111 of power conversion apparatus 100. When terminal T25 is electrically connected to terminal 135, communication can be performed between controller 32 of charging cable 320 and controller 111 of power conversion apparatus 100 in accordance with the CPLT signal. AC inlet 102 may have a circuit (not shown) configured to convert the PISW signal and the CPLT signal received from charging cable 320 such that controller 111 can process (or recognize) the PISW signal and the CPLT signal.

Figure 5:
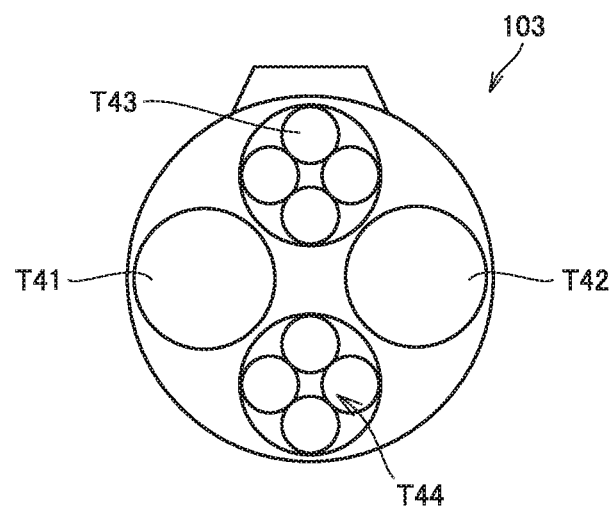
FIG. 5 shows a connection surface of a DC connector power conversion apparatus shown in FIG. 3.

FIG. 5 shows a connection surface of DC connector 103. Although FIG. 5 shows a DC connector for the CHAdeMO method by way of example, the technique of the present disclosure is also applicable to a connector for another method (e.g., a CCS (Combined Charging System) method or a GB/T method).

Referring to FIG. 5 together with FIG. 3, terminals T41 and T42 of DC connector 103 are power terminals (a. P (positive) terminal/an N (negative) terminal) from which DC power is output. Terminal T43 is a ground terminal and is electrically connected to the ground line in main body portion 101. Terminal group T44 includes a plurality of signal terminals. Terminal group T44 includes a CAN (Controller Area Network) signal terminal and a CNCT signal terminal (a terminal for checking connector connection).

Referring to FIGS. 1 and 3, terminals T41 to T43 and terminal group T44 of DC connector 103 correspond to terminals T51 to T53 and terminal group T54 of DC inlet 210 of vehicle 200, respectively. In a state (fitted state) where DC connector 103 is connected to DC inlet 210, terminals T41 to T43 of DC connector 103 are connected to terminals T51 to T53 of DC inlet 210, respectively. Each terminal included in terminal group T44 is also connected to the corresponding terminal of terminal group T54. When DC connector 103 is connected to DC inlet 210, controller 111 of power conversion apparatus 100 and vehicle ECU 250 of vehicle 200 are connected to be communicable with each other.

Referring again to FIG. 3, power conversion apparatus 100 is configured to perform AC/DC conversion (conversion from AC to DC) of AC power input from AC inlet 102 and output DC power to DC connector 103. The AC power input to terminals T31 and T32 of AC inlet 102 is output to terminals T41 and T42 of DC connector 103 through AC-side sensor 112, power conversion circuit PC1 (PFC circuit 113, insulating circuit 114, cut-off switches 131 and 132, and rectifier circuit 115), and DC-side sensor 116.

AC-side sensor 112 is arranged between terminals T31 and T32 of AC inlet 102 and PFC circuit 113. AC-side sensor 112 includes a voltage sensor configured to detect a voltage of the electric power input to AC inlet 102, and a current sensor configured to detect a current flowing between AC inlet 102 and PFC circuit 113.

PFC circuit 113 is configured to convert an AC voltage input from the AC inlet 102 side to a DC voltage and further convert the DC voltage to a high-frequency AC voltage. As a result of this power conversion, a current waveform becomes close to a sinusoidal wave having the same phase as a voltage waveform and a power factor is improved. A known PFC circuit may be used as PFC circuit 113. A specific example of a configuration of PFC circuit 113 will be described below (see FIG. 6).

Insulating circuit 114 is located between PFC circuit 113 and rectifier circuit 115. Insulating circuit 114 is configured to electrically insulate the circuit on the AC inlet 102 side from the circuit on the DC connector 103 side. A known insulating circuit may be used as insulating circuit 114. In the present embodiment, an insulating transformer is used as insulating circuit 114. Transmission of electric power in insulating circuit 114 is performed using a voltage, not a current. A specific example of a configuration of insulating circuit 114 will be described below (see FIG. 6).

Insulating circuit 114 boosts the AC voltage input from the AC inlet 102 side and applies the boosted AC voltage to the circuit on the DC connector 103 side. As a result of the application of the voltage, the current flows through the circuit located on the DC connector 103 side relative to insulating circuit 114. The AC power output from insulating circuit 114 to the DC connector 103 side is supplied to rectifier circuit 115 through cut-off switches 131 and 132.

Cut-off switches 131 and 132 are arranged between insulating circuit 114 and rectifier circuit 115. Cut-off switches 131 and 132 are configured to switch conduction and cut-off of the current between insulating circuit 114 and rectifier circuit 115. A state (closed state/open state) of cut-off switches 131 and 132 is controlled by controller 111. When cut-off switches 131 and 132 are in the closed state (conducting state), flow of the current from insulating circuit 114 to rectifier circuit 115 is permitted. When cut-off switches 131 and 132 are in the open state (cut-off state), flow of the current from insulating circuit 114 to rectifier circuit 115 is prohibited. Cut-off switches 131 and 132 according to the present embodiment correspond to one example of "first switch" according to the present disclosure.

Rectifier circuit 115 is located on the DC connector 103 side relative to insulating circuit 114 and is configured to convert the AC power supplied from insulating circuit 114 to DC power. A known rectifier circuit may be used as rectifier circuit 115. A specific example of a configuration of rectifier circuit 115 will be described below (see FIG. 6).

DC-side sensor 116 is arranged between rectifier circuit 115 and terminals T41 and T42 of DC connector 103. DC-side sensor 116 includes a voltage sensor configured to detect a voltage of the electric power output to DC connector 103, and a current sensor configured to detect a current between rectifier circuit 115 and DC connector 103. Rectifier circuit 115 and the current sensor of DC-side sensor 116 according to the present embodiment correspond to one example of "first power conversion circuit" and "first current sensor" according to the present disclosure, respectively.

Figure 6:
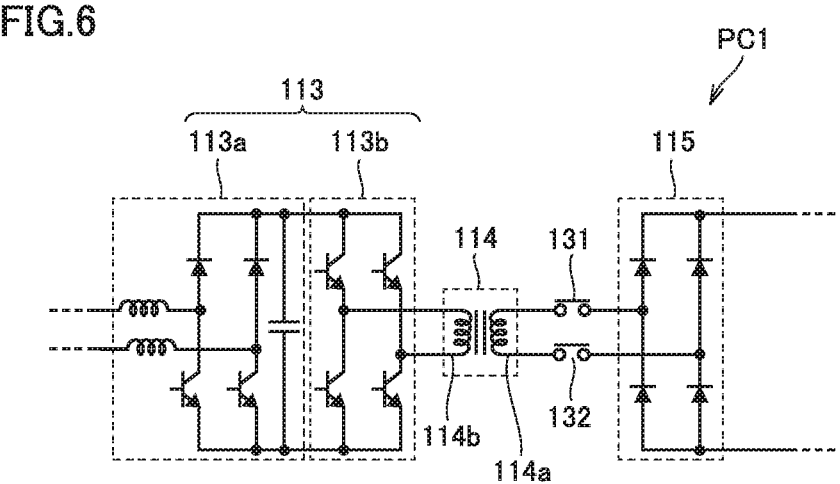
FIG. 6 shows details of a power conversion circuit shown in FIG. 3.

FIG. 6 shows details of power conversion circuit PC1. Referring to FIG. 6 together with FIG. 3, PFC circuit 113 includes a rectifier circuit 113*a* and an inverter 113*b*. Insulating circuit 114 is an insulating transformer including a first coil 114*a* and a second coil 114*b*.

Rectifier circuit 113*a* is configured to rectify and boost the input AC power. More specifically, rectifier circuit 113*a* includes two pairs of upper and lower arms, two reactors and one smoothing capacitor. In each pair of upper and lower arms, the upper arm includes a diode and the lower arm includes a switching element. The switching element of the lower arm is controlled by controller 111. Each switching element included in rectifier circuit 113a is controlled by controller 111, and thus, rectifier circuit 113a functions as a boosting chopper circuit.

Inverter 113b is a full-bridge circuit including four switching elements. Each switching element is controlled by controller 111. Each switching element included in inverter 113b is controlled by controller 111 and the DC power input from rectifier circuit 113a to inverter 113b is thereby converted to high-frequency AC power.

In insulating circuit 114, second coil 114b is located on the AC inlet 102 side (PFC circuit 113 side) relative to first coil 114a. Rectifier circuit 115 is connected to first coil 114a of insulating circuit 114 with cut-off switches 131 and 132 being interposed, and PFC circuit 113 is connected to second coil 114b of insulating circuit 114 through an electric line. First coil 114a and second coil 114b are electrically insulated from each other. An electric power path on the AC inlet 102 side (PFC circuit 113 side) relative to second coil 114b and an electric power path on the DC connector 103 side (rectifier circuit 115 side) relative to first coil 114a are electrically insulated from each other by insulating circuit 114. Insulating circuit 114 boosts the AC voltage applied to second coil 114b and outputs the boosted AC voltage to first coil 114a.

Each of cut-off switches 131 and 132 is connected in series to first coil 114a, and is configured to switch conduction and cut-off of the current flowing through first coil 114a. An electromagnetic mechanical relay can, for example, be used as cut-off switches 131 and 132. However, a semiconductor relay that is also referred to as "SSR (Solid State Relay)" may be used as cut-off switches 131 and 132. Examples of the semiconductor relay include a relay formed of a thyristor, a triac or a transistor (such as an IGBT, a MOSFET or a bipolar transistor).

Rectifier circuit 115 is a diode bridge circuit including four diodes. Rectifier circuit 115 is configured to convert the AC power supplied from first coil 114a of insulating circuit 114 to DC power.

Referring again to FIG. 3, when AC power is input to terminals T31 and T32 of AC inlet 102 in power conversion apparatus 100, DC power is generated by power conversion circuit PC1 and the generated DC power is output to terminals T41 and T42 of DC connector 103. At this time, a current flowing between AC inlet 102 and PFC circuit 113 is detected by AC-side sensor 112, and a current flowing between rectifier circuit 115 and DC connector 103 is detected by DC-side sensor 116. A result of detection by each of AC-side sensor 112 and DC-side sensor 116 is input to controller 111.

Controller 111 includes a processor, a memory device and an input; output port (all are not shown). A CPU (Central Processing Unit) can, for example, be used as the processor. The memory device includes a RAM (Random Access Memory) configured to temporarily store data, and a storage (e.g., a ROM (Read Only Memory) and a rewritable non-volatile memory) configured to save various types of information. In addition to programs used in various types of control, various parameters used in the programs are also prestored in the storage. The processor executes the programs stored in the memory device and the various types of control are thereby performed. The various types of control can be processed not only by software but also by dedicated hardware (electronic circuit).

Power supply circuit 120 is configured to generate driving power of controller 111 (i.e., electric power for operating controller 111) using electric power supplied from a prescribed power supply, and supply the generated driving power to controller 111. Power supply circuit 120 may generate the driving power of controller 111 using electric power of a secondary battery (not shown) in main body portion 101, or may generate the driving power of controller 111 using electric power flowing between AC inlet 102 and DC connector 103 (more particularly, between terminals T31 and T32 and terminals T41 and T42).

Controller 111 according to the present embodiment includes a charging control unit 11 and a cut-off control unit 12. Charging control unit 11 and cut-off control unit 12 are implemented, for example, by a processor and a program executed by the processor. In the present embodiment, cut-off switches 131 and 132, the current sensor of DC-side sensor 116, and controller 111 form one example of "interrupter" according to the present disclosure.

Charging control unit 11 is configured to control charging power of battery 240 (vehicle-mounted battery). More specifically, charging control unit 11 is configured to control PIT circuit 113 based on the result of detection by each of AC-side sensor 112 and DC-side sensor 116, to thereby control output power of power conversion apparatus 100 (and further, charging power of battery 240).

Cut-off control unit 12 is configured to cut off a current between AC inlet 102 and DC connector 103, when an abnormality of the current is detected between AC inlet 102 and DC connector 103. More specifically, cut-off control unit 12 is configured to bring cut-off switches 131 and 132 into the open state to thereby cut off the current, when the abnormality of the current (e.g., electric leakage or overcurrent) is detected by the current sensor of DC-side sensor 116 while electric power is being input to AC inlet 102 (e.g., while electric power is being supplied from power feeding facility 300 through power conversion apparatus 100 to vehicle 200). Cut-off control unit 12 may determine that the abnormality of the current (more particularly, electric leakage) occurs, when an equilibrium state of the current flowing through terminals T41 and T42 (the P terminal and the N terminal) is disturbed. Alternatively, cut-off control unit 12 may determine that the abnormality of the current (more particularly, overcurrent) occurs, when the excessive current is detected in one of terminals T41 and T42 (the P terminal and the N terminal).

As described above, power conversion apparatus 100 according to the present embodiment includes DC connector 103 connectable to DC inlet 210 (DC power inlet) of vehicle 200, AC inlet 102 connectable to AC connector 323 of charging cable 320 (AC power cable), and rectifier circuit 115 (first power conversion circuit) located between AC inlet 102 and DC connector 103 (see FIGS. 1 and 3). Rectifier circuit 115 is configured to convert AC power input from the AC inlet 102 side to DC power and output the DC power to the DC connector 103 side. By using power conversion apparatus 100 configured as described above, the AC power supplied from power feeding facility 300 for the AC method can be converted to the DC power and the DC power can be supplied to vehicle 200. Therefore, according to above-described power conversion apparatus 100, vehicle 200 including only the DC inlet can be supplied with the electric power from power feeding facility 300.

Power conversion apparatus 100 according to the present embodiment includes insulating circuit 114 located between AC inlet 102 and DC connector 103. Controller 111 is configured to bring cut-off switches 131 and 132 into the open state to thereby cut off a current, when an abnormality of the current is detected by DC-side sensor 116 while electric power is being input to AC inlet 102. In power conversion apparatus 100 configured as described above, the circuit on the AC inlet 102 side and the circuit on the DC connector 103 side are electrically insulated by insulating circuit 114. Therefore, even when an overcurrent occurs in the circuit on the AC inlet 102 side relative to insulating circuit 114, the overcurrent does not flow into the circuit on the DC connector 103 side relative to insulating circuit 114. In addition, when the abnormality of the current is detected, controller 111 causes cut-off switches 131 and 132 to cut off the current. Therefore, even when an abnormality of the current occurs during charging of battery 240, for example, the circuit on the power reception side (e.g., the electronic circuit of vehicle 200) can be appropriately protected.

In power conversion apparatus 100 according to the present embodiment, each of cut-off switches 131 and 132 is connected in series to first coil 114a of insulating circuit 114 (more particularly, an insulating transformer), and is configured to switch conduction and cut-off of a current flowing through first coil 114a (see FIG. 6). In above-described power conversion apparatus 100, when an abnormal current is detected, the current can be cut off in the vicinity of insulating circuit 114. Insulation is performed by both insulating circuit 114 and cut-off switches 131 and 132, and thus, the circuit on the power reception side is protected more reliably.

AC inlet 102 of power conversion apparatus 100 according to the present embodiment includes terminals T31 and T32 (power terminal) connectable to a power line of charging cable 320, terminal T35 (CPLT signal terminal) connectable to a CPU signal line of charging cable 320, and terminal T33 (ground terminal) connectable to a ground line of charging cable 320. According to above-described power conversion apparatus 100, battery 240 can be appropriately charged.

Second Embodiment

A power conversion apparatus according to a second embodiment of the present disclosure will be described. The power conversion apparatus according to the second embodiment is also applicable to the power feeding system shown in FIG. 1, for example. Since there are many common features between the first embodiment and the second embodiment, differences will be mainly described and description of the common features will not be repeated.

Figure 7:
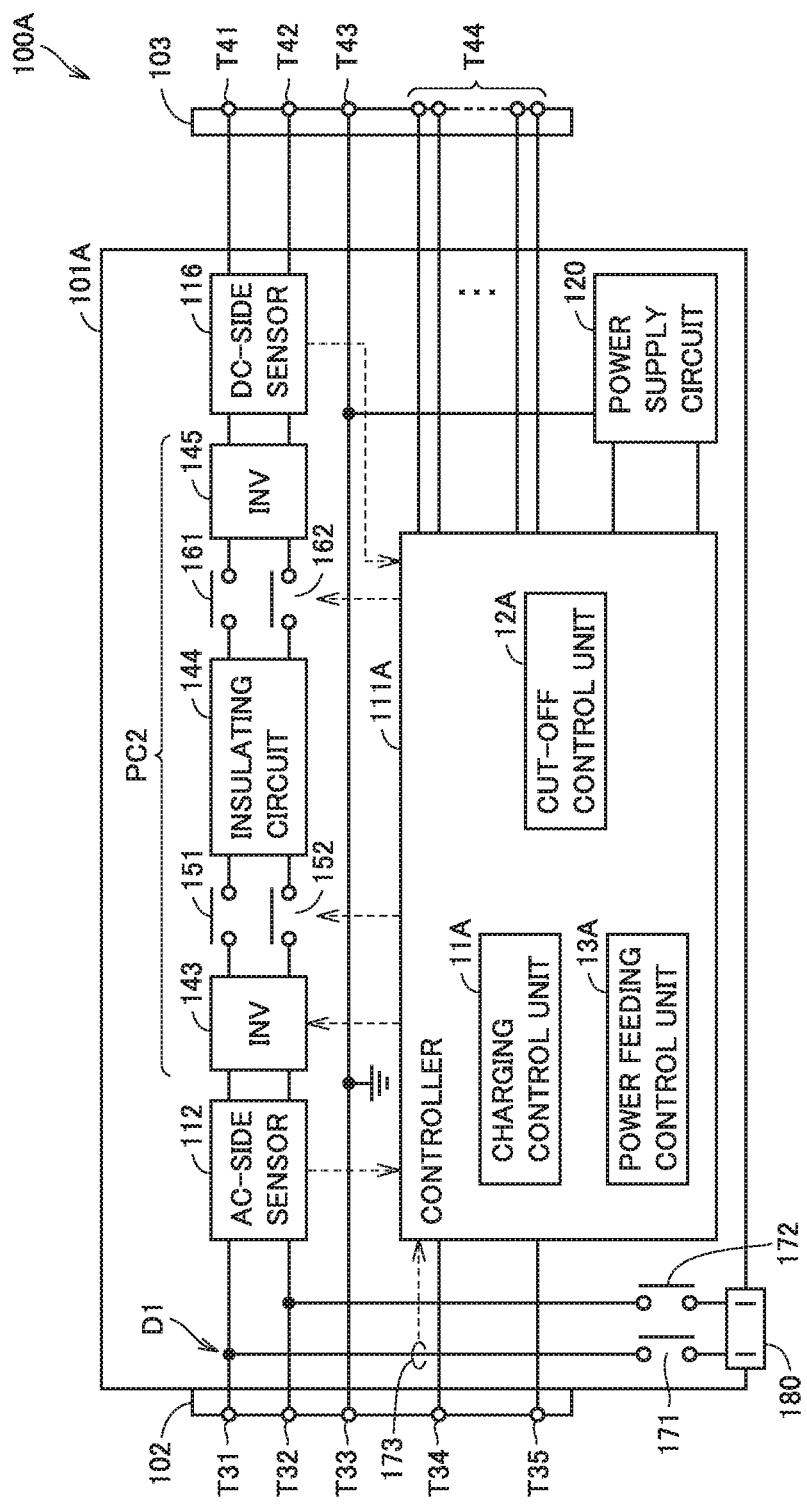
FIG. 7 shows a configuration of a power conversion apparatus according to a second embodiment of the present disclosure.

FIG. 7 shows a configuration of the power conversion apparatus according to the second embodiment of the present disclosure. Referring to FIG. 7, a power conversion apparatus 100A according to the second embodiment basically has a configuration equivalent to that of power conversion apparatus 100 (see FIG. 3) according to the first embodiment. However, power conversion apparatus 100A includes a main body portion 101A, instead of main body portion 101. Main body portion 101A includes a power conversion circuit PC2 and a controller 111A, instead of power conversion circuit PC1 and controller 111 in main body portion 101. Main body portion 101A further includes switches 171 and 172, a current sensor 173 and an electrical outlet 180.

Power conversion apparatus 100A is configured to, when AC power is input to AC inlet 102, perform AC/DC conversion (conversion from AC to DC) of the input AC power and output DC power to DC connector 103. Power conversion apparatus 100A is also configured to, when DC power is input to DC connector 103, perform DC/AC conversion (conversion from DC to AC) of the input DC power and output AC power to AC inlet 102. Power conversion circuit PC2 in power conversion apparatus 100A is configured to perform bidirectional power conversion.

Power conversion circuit PC2 includes an inverter 143, cut-off switches 151 and 152, an insulating circuit 144, cut-off switches 161 and 162, and an inverter 145. Power conversion circuit PC2 functions as a bidirectional converter. A specific example of a configuration of power conversion circuit PC2 will be described below (see FIG. 8). In power conversion apparatus 100A, AC-side sensor 112 is provided on the AC inlet 102 side of power conversion circuit PC2, and DC-side sensor 116 is provided on the DC connector 103 side of power conversion circuit PC2. Configurations of AC-side sensor 112 and DC-side sensor 116 are the same as those of the first embodiment, for example. Inverter 145 and the current sensor of DC-side sensor 116 according to the present embodiment correspond to one example of "first power conversion circuit" and "first current sensor" according to the present disclosure, respectively. In addition, inverter 143 and the current sensor of AC-side sensor 112 according to the present embodiment correspond to one example of "second power conversion circuit" and "second current sensor" according to the present disclosure, respectively.

Cut-off switches 151 and 152 are arranged between inverter 143 and insulating circuit 144. Cut-off switches 151 and 152 are configured to switch conduction and cut-off of a current between inverter 143 and insulating circuit 144. A state (closed state/open state) of cut-off switches 151 and 152 is controlled by controller 111A. When cut-off switches 151 and 152 are in the closed state (conducting state), a current path connecting inverter 143 and insulating circuit 144 is connected. When cut-off switches 151 and 152 are in the open state (cut-off state), the current path connecting inverter 143 and insulating circuit 144 is cut off. Cut-off switches 151 and 152 according to the present embodiment correspond to one example of "second switch" according to the present disclosure.

Cut-off switches 161 and 162 are arranged between insulating circuit 144 and inverter 145. Cut-off switches 161 and 162 are configured to switch conduction and cut-off of a current between insulating circuit 144 and inverter 145. A state (closed state/open state) of cut-off switches 161 and 162 is controlled by controller 111A. When cut-off switches 161 and 162 are in the closed state (conducting state), a current path connecting insulating circuit 144 and inverter 145 is connected. When cut-off switches 161 and 162 are in the open state (cut-off state), the current path connecting insulating circuit 144 and inverter 145 is cut off. Cut-off switches 161 and 162 according to the present embodiment correspond to one example of "first switch" according to the present disclosure.

Figure 8:
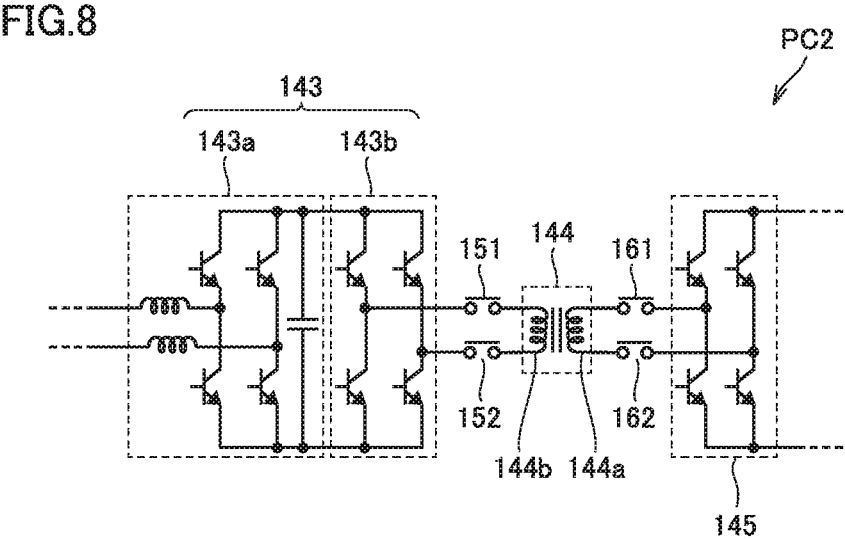
FIG. 8 shows details of a power conversion circuit shown in FIG. 7.

FIG. 8 shows details of power conversion circuit PC2. Referring to FIG. 8 together with FIG. 7, inverter 143 includes a first inverter 143a and a second inverter 143b. First inverter 143a includes a full bridge circuit including four switching elements, two reactors, and one smoothing capacitor. Second inverter 143b is a full bridge circuit including four switching elements. Inverter 145 is also a full bridge circuit including four switching elements. Each of the switching elements included in inverters 143 and 145 is controlled by controller 111A.

Insulating circuit 144 is an insulating transformer including a first coil 144a and a second coil 144b. Second coil 144b is located on the AC inlet 102 side (inverter 143 side) relative to first coil 144a. Inverter 143 is connected to second coil 144b of insulating circuit 144 with cut-off switches 151 and 152 being interposed, and inverter 145 is connected to first coil 144a of insulating circuit 144 with cut-off switches 161 and 162 being interposed. First coil 144a and second coil 144b are electrically insulated from each other. An electric power path on the AC inlet 102 side (inverter 143 side) relative to second coil 144b and an electric power path on the DC connector 103 side (inverter 145 side) relative to first coil 144a are electrically insulated by insulating circuit 144.

Each of cut-off switches 151 and 152 is connected in series to second coil 144b, and is configured to switch conduction and cut-off of a current flowing through second coil 144b. Each of cut-off switches 161 and 162 is connected in series to first coil 144a, and is configured to switch conduction and cut-off of a current flowing through first coil 144a. An electromagnetic mechanical relay can, for example, be used as cut-off switches 151, 152, 161, and 162. However, cut-off switches 151, 152, 161, and 162 are not limited thereto, and a semiconductor relay may be used as cut-off switches 151, 152, 161, and 162.

Referring again to FIG. 7, electrical outlet 180 is an electrical outlet configured to output AC power generated through power conversion circuit PC2 from DC power input to DC connector 103. Electrical outlet 180 is connected to terminals T31 and T32 with switches 171 and 172 being interposed. A state (closed state/open state) of switches 171 and 172 is controlled by controller 111A. Current sensor 173 is provided between terminal T31 and switch 171. Current sensor 173 is configured to measure a current of electrical outlet 180. A result of detection by current sensor 173 is output to controller 111A. When above-described switches 171 and 172 are in the closed state (conducting state), electric power that is the same as electric power output to terminals T31 and T32 is output to electrical outlet 180. When switches 171 and 172 are in the open state (cut-off state), the electric power is not output to electrical outlet 180. In the example of FIG. 7, current sensor 173 is provided on the switch 171 side relative to a branch point D1. However, current sensor 173 may be provided on the terminal T31 side relative to branch point D1.

Controller 111A has the same hardware configuration as that of controller 111 in the first embodiment. That is, controller 111A also includes a processor and a memory device (both are not shown). However, programs different from those of controller 111 are stored in the memory device of controller 111A, and controller 111A is configured to perform a process different from that of controller 111. Controller 111A includes a charging control unit 11A, a cut-off control unit 12A and a power feeding control unit 13A. Charging control unit 11A, cut-off control unit 12A and power feeding control unit 13A are implemented, for example, by a processor and a program executed by the processor. In the present embodiment, cut-off switches 151, 152, 161, and 162, the current sensor of AC-side sensor 112, the current sensor of DC-side sensor 116, and controller 111A form one example of "interrupter" according to the present disclosure.

Charging control unit 11A is configured to control charging power of battery 240 (vehicle-mounted battery) shown in FIG. 1, for example. When electric power is input to AC inlet 102 (e.g., when electric power is supplied from power feeding facility 300 through power conversion apparatus 100A to vehicle 200 in the power feeding system shown in FIG. 1), power conversion circuit PC2 shown in FIG. 8 operates as follows.

Referring to FIG. 8 together with FIG. 7, first inverter 143a rectifies AC power input from AC inlet 102 and outputs the rectified AC power to second inverter 143b, and second inverter 143b converts DC power received from first inverter 143a to high-frequency AC power. Insulating circuit 144 transmits the output (AC power) of second inverter 143b to inverter 145, and inverter 145 rectifies the AC power received from insulating circuit 144 and outputs the rectified AC power to DC connector 103. Charging control unit 11A is configured to control inverters 143 and 145 based on a result of detection by each of AC-side sensor 112 and DC-side sensor 116, to thereby control output power of power conversion apparatus 100A (and further, charging power of battery 240).

Referring again to FIG. 7, cut-off control unit 12A is configured to bring cut-off switches 161 and 162 into the open state, when an abnormality of the current (e.g., electric leakage or overcurrent) is detected by the current sensor of DC-side sensor 116 while the electric power is being input to AC inlet 102 as described above. Therefore, the circuit on the power reception side (e.g., the electronic circuit of vehicle 200) can be protected when the abnormality of the current occurs.

Power feeding control unit 13A is configured to, when electric power of vehicle 200 shown in FIG. 1 (e.g., electric power stored in the vehicle-mounted battery or electric power generated in vehicle 200) is, for example, fed to the outside of the vehicle, control the fed electric power. Power feeding control unit 13A is configured to bring switches 171 and 172 into the closed state when power feeding to the outside of the vehicle starts (e.g., when a prescribed start condition is satisfied), and return switches 171 and 172 to the open state when power feeding to the outside of the vehicle ends (e.g., when a prescribed end condition is satisfied). When electric power is input to DC connector 103 (e.g., when electric power is supplied from vehicle 200 through power conversion apparatus 100A to the outside of the vehicle in the power feeding system shown in FIG. 1), power conversion circuit PC2 shown in FIG. 8 operates as follows.

Referring to FIG. 8 together with FIG. 7, inverter 145 converts DC power input from DC connector 103 to high-frequency AC power and outputs the high-frequency AC power to insulating circuit 144. Insulating circuit 144 transmits the output (AC power) of inverter 145 to second inverter 143b, and second inverter 143b rectifies the AC power received from insulating circuit 144 and outputs the rectified AC power to first inverter 143a. First inverter 143a converts the DC power received from second inverter 143b to AC power and outputs the AC power to AC inlet 102 and electrical outlet 180. As a result, the electric power output from AC inlet 102 and electrical outlet 180 can be supplied to an electrical load (not shown). When a plug connecting to the electrical load is connected to electrical outlet 180 or when an AC connector connecting to the electrical load is connected to AC inlet 102, the electric power of vehicle 200 can be supplied to the electrical load. Examples of the electrical load include a V2H (Vehicle to Home) stand, an electric appliance (e.g., a cooker and lighting equipment used outdoors), and a power storage device of another vehicle.

Referring again to FIG. 7, cut-off control unit 12A is configured to bring cut-off switches 151 and 152 into the open state, when an abnormality of the current (e.g., electric leakage or overcurrent) is detected by the current sensor of AC-side sensor 112 while the electric power is being input to DC connector 103 as described above. Therefore, the circuit on the power reception side (e.g., the electronic circuit of the electrical load) can be protected when the abnormality of the current occurs.

As described above, in power conversion apparatus 100A according to the present embodiment as well, the AC power supplied from the power feeding facility for the AC method can be converted to the DC power and the DC power can be supplied to the vehicle. Furthermore, in power conversion apparatus 100A according to the present embodiment, the AC power can also be supplied from the vehicle through power conversion apparatus 100A to the outside of the vehicle.

Other Embodiments

The configuration of the power conversion apparatus is not limited to the configurations shown in FIGS. 3 and 7, and can be changed as appropriate, as long as the power conversion apparatus is configured to convert AC power input from the AC inlet 102 side to DC power and output the DC power to the DC connector 103 side.

In power conversion apparatus 100A (FIG. 7) according to the second embodiment, cut-off switches 151 and 152 or cut-off switches 161 and 162 may be omitted. For example, power conversion apparatus 100A (FIG. 7) according to the second embodiment may be modified as described below.

Figure 9:
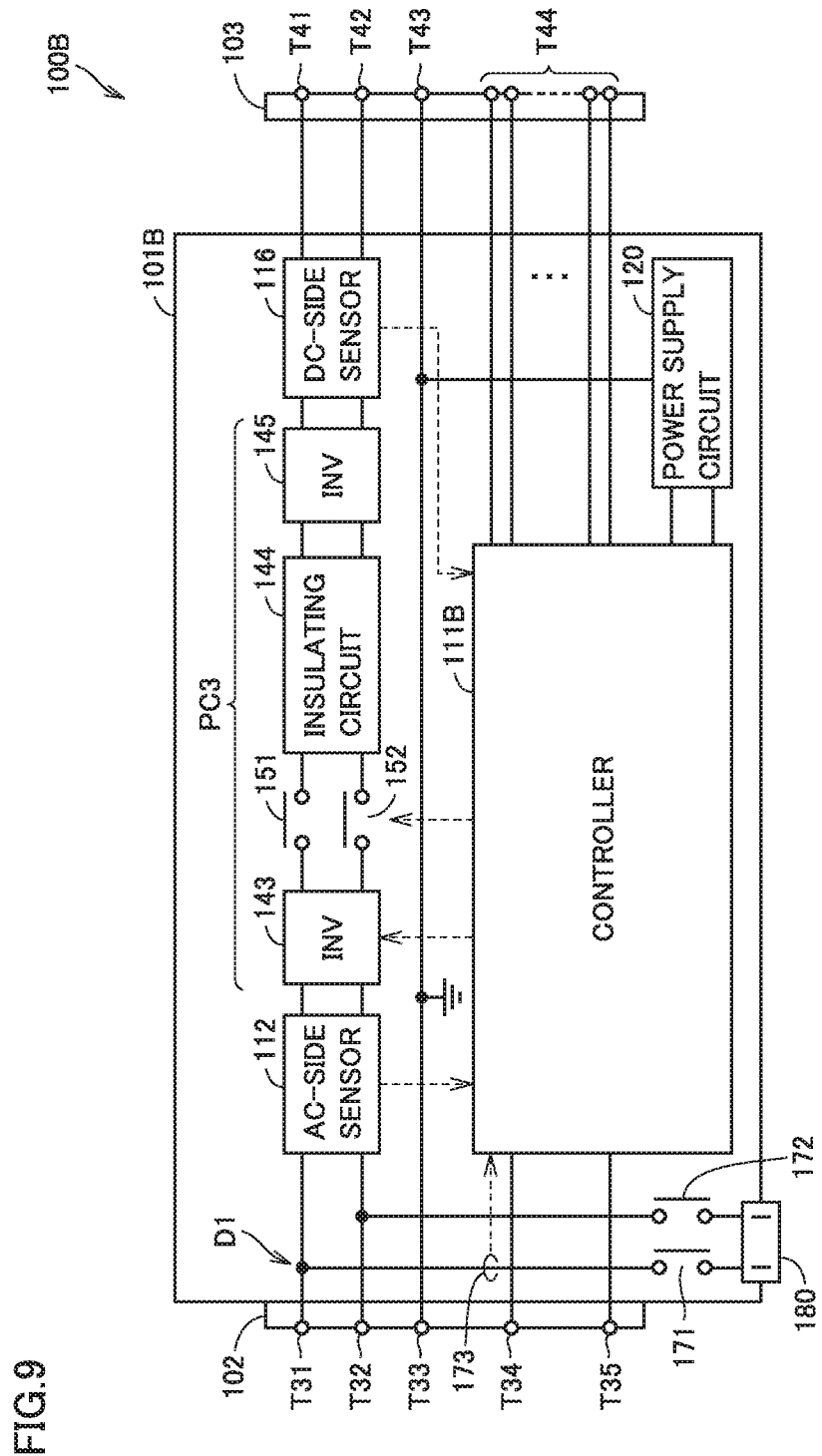
FIG. 9 shows a modification of the configuration of the power conversion apparatus shown in FIG. 7.

FIG. 9 shows a modification of the configuration of the power conversion apparatus. Referring to FIG. 9, a power conversion apparatus 100B includes a main body portion 101B, instead of main body portion 101A. Main body portion 101B includes a power conversion circuit PC3 and a controller 111B, instead of power conversion circuit PC2 and controller 111A in main body portion 101A. Power conversion circuit PC3 has the same configuration as that of power conversion circuit PC2, except that cut-off switches 161 and 162 are omitted. In power conversion circuit PC3, insulating circuit 144 is directly connected to inverter 145.

Controller 111B has the same hardware configuration as that of controller 111A according to the second embodiment. That is, controller 111B also includes a processor and a memory device (both are not shown). Controller 111B does not cut off a current when electric power is supplied from AC inlet 102 to DC connector 103, and cuts off a current only when electric power is supplied from DC connector 103 to AC inlet 102. That is, controller 111B is configured to bring cut-off switches 151 and 152 into the open state, when an abnormality of the current (e.g., electric leakage or overcurrent) is detected by the current sensor of AC-side sensor 112 while the electric power is being input to DC connector 103. In the present modification, cut-off switches 151 and 152, the current sensor of AC-side sensor 112, and controller 111B form one example of "interrupter" according to the present disclosure.

Switches 171 and 172 and electrical outlet 180 in main body portions 101A and 101B may be omitted and power feeding to the outside may be performed only by AC inlet 102.

While the embodiments of the present disclosure have been described, it should be understood that the embodiments disclosed herein are illustrative and non-restrictive in every respect. The scope of the present disclosure is defined by the terms of the claims and is intended to include any modifications within the scope and meaning equivalent to the terms of the claims.

What is claimed is:
1. A power conversion apparatus comprising:
a DC connector connectable to a DC power inlet of a vehicle;
an AC inlet connectable to a connector of an AC power cable;
a first power conversion circuit located between the AC inlet and the DC connector, and configured to convert AC power input from the AC inlet side to DC power and output the DC power to the DC connector side;
an insulating circuit located between the AC inlet and the DC connector; and
an interrupter configured to interrupt a current between the AC inlet and the DC connector, when the interrupter detects an abnormality of the current between the AC inlet and the DC connector.

2. The power conversion apparatus according to claim 1, wherein
the first power conversion circuit is located on the DC connector side relative to the insulating circuit,
the interrupter includes:
a first switch configured to switch conduction and cut-off of a current between the insulating circuit and the DC connector;
a first current sensor configured to detect a current flowing between the first power conversion circuit and the DC connector; and
a first controller configured to control the first switch, and
the first controller is configured to bring the first switch into an open state to thereby cut off the current, when the abnormality of the current is detected by the first current sensor while electric power is being input to the AC inlet.

3. The power conversion apparatus according to claim 2, further comprising
a second power conversion circuit located between the AC inlet and the insulating circuit, and configured to perform prescribed power conversion, wherein
the interrupter includes:
a second switch configured to switch conduction and cut-off of a current between the AC inlet and the insulating circuit;
a second current sensor configured to detect a current flowing between the second power conversion circuit and the AC inlet; and
a second controller configured to control the second switch, and
the second controller is configured to bring the second switch into an open state to thereby cut off the current, when the abnormality of the current is detected by the second current sensor while electric power is being input to the DC connector.

4. The power conversion apparatus according to claim 1, wherein
the insulating circuit is an insulating transformer including a first coil and a second coil located on the AC inlet side relative to the first coil,
the interrupter includes:
a switch configured to switch conduction and cut-off of a current flowing through the first coil or the second coil; and
a controller configured to control the switch,
the switch is connected in series to the first coil or the second coil, and
the controller is configured to bring the switch into an open state to thereby cut off the current, when the abnormality of the current is detected by the interrupter.

5. The power conversion apparatus according to claim 1, wherein
the first power conversion circuit is configured to convert DC power input from the DC connector side to AC power and output the AC power to the AC inlet side.

6. The power conversion apparatus according to claim 5, further comprising
an electrical outlet configured to output AC power generated through the first power conversion circuit from DC power input to the DC connector.

7. A power conversion apparatus comprising:
a DC connector connectable to a DC power inlet of a vehicle;
an AC inlet connectable to a connector of an AC power cable; and
a first power conversion circuit located between the AC inlet and the DC connector, and configured to convert AC power input from the AC inlet side to DC power and output the DC power to the DC connector side, wherein
the AC power cable is a charging cable of a power feeding facility configured to supply electric power for charging a vehicle-mounted battery to the vehicle, and
the AC inlet includes:
a power terminal connectable to a power line of the charging cable;
a CPLT signal terminal connectable to a CPLT signal line of the charging cable; and
a ground terminal connectable to a ground line of the charging cable.

8. The power conversion apparatus according to claim 7, further comprising:
an insulating circuit located between the AC inlet and the DC connector; and
an interrupter configured to interrupt a current between the AC inlet and the DC connector, when the interrupter detects an abnormality of the current between the AC inlet and the DC connector.

9. The power conversion apparatus according to claim 8, wherein
the first power conversion circuit is located on the DC connector side relative to the insulating circuit,
the interrupter includes:
a first switch configured to switch conduction and cut-off of a current between the insulating circuit and the DC connector;
a first current sensor configured to detect a current flowing between the first power conversion circuit and the DC connector; and
a first controller configured to control the first switch, and
the first controller is configured to bring the first switch into an open state to thereby cut off the current, when the abnormality of the current is detected by the first current sensor while electric power is being input to the AC inlet.

10. The power conversion apparatus according to claim 9, further comprising
a second power conversion circuit located between the AC inlet and the insulating circuit, and configured to perform prescribed power conversion, wherein
the interrupter includes:
a second switch configured to switch conduction and cut-off of a current between the AC inlet and the insulating circuit;
a second current sensor configured to detect a current flowing between the second power conversion circuit and the AC inlet; and
a second controller configured to control the second switch, and
the second controller is configured to bring the second switch into an open state to thereby cut off the current, when the abnormality of the current is detected by the second current sensor while electric power is being input to the DC connector.

11. The power conversion apparatus according to claim 8, wherein
the insulating circuit is an insulating transformer including a first coil and a second coil located on the AC inlet side relative to the first coil,
the interrupter includes:
a switch configured to switch conduction and cut-off of a current flowing through the first coil or the second coil; and
a controller configured to control the switch,
the switch is connected in series to the first coil or the second coil, and
the controller is configured to bring the switch into an open state to thereby cut off the current, when the abnormality of the current is detected by the interrupter.

12. The power conversion apparatus according to claim 7, wherein
the first power conversion circuit is configured to convert DC power input from the DC connector side to AC power and output the AC power to the AC inlet side.

13. The power conversion apparatus according to claim 12, further comprising
an electrical outlet configured to output AC power generated through the first power conversion circuit from DC power input to the DC connector.

* * * * *